United States Patent [19]
Donahue et al.

[11] Patent Number: 5,321,494
[45] Date of Patent: Jun. 14, 1994

[54] SUBTRACTIVE MEASUREMENT METHOD AND APPARATUS FOR CRT OUTPUT INTENSITY MEASUREMENT

[75] Inventors: Timothy F. Donahue, Farmington; James W. Fulmer, Canandaigua, both of N.Y.

[73] Assignee: Eastman Kodak Company, Rochester, N.Y.

[21] Appl. No.: 855,400

[22] Filed: Mar. 23, 1992

[51] Int. Cl.$^5$ .................. G01J 1/42; H04N 17/02
[52] U.S. Cl. ................. 356/218; 348/191
[58] Field of Search ........ 356/218, 221, 229, 222, 356/228; 358/10, 29, 36, 66; 354/410, 402; 250/549, 204

[56] References Cited

U.S. PATENT DOCUMENTS

| | | | |
|---|---|---|---|
| 3,846,772 | 11/1974 | Peberdy | 356/435 |
| 3,962,722 | 6/1976 | Ciciora. | |
| 4,156,564 | 5/1979 | Tsunekawa et al. | 354/59 |
| 4,254,432 | 3/1981 | Nakahata. | |
| 4,494,876 | 1/1985 | Van Wandelen | 356/404 |
| 4,688,079 | 8/1987 | Fendley. | |
| 4,700,218 | 10/1987 | Thomsen et al. | |
| 4,746,970 | 5/1988 | Hosokawa et al. | |
| 4,814,858 | 3/1989 | Mochizuki et al. | |

FOREIGN PATENT DOCUMENTS 61-209342 9/1986 Japan.

OTHER PUBLICATIONS

*Journal of the Society of Motion Picture and Television Engineers*, vol. 79, No. 9, Sep. 1970, pp. 802-803, Y. Otsuka, "Tone Adjustments in Color Television".
*Journal of Imaging Technology*, vol. 13, No. 4, Aug. 1987, pp. 103-108, W. T. Hartman et al., "Prediction of Display Colorimetry from Digital Video Signals".
PrecisionColor Calibrator User's Manual, Jan. 1990, Radius Inc. San Jose, Ca.
The Press Special Issue, Kodak, Mar. 1991.
Kodak Precision Series of Software Calibration Utilities.
Rasterops Offers Unprecedented Color Accuracy with Correctcolor Management System, Jan. 13, 1992.
RasterOps Correct Color management System.
Cachet Color Software article.
ScanMatch Color Calibration Software manual.
SuperMatch Display Calibrator User's manual.

*Primary Examiner*—Richard A. Rosenberger
*Assistant Examiner*—Hoa Q. Pham
*Attorney, Agent, or Firm*—Mark Z. Dudley; Thomas H. Close

[57] ABSTRACT

A subtractive measurement technique in which a CRT display light intensity output is biased above a noise range of a low cost sensor by turning on one or more electron beam guns to produce light levels above the noise range. A bias value is measured. Electron beam guns for colors other than the color being measured are turned on. The gun for the color to be measured is then incremented through its operating range and measured light intensity values at each step are obtained using the sensor. The bias value is subtracted from the measured values to obtain the actual light intensity values for the color primary control value to luminance transfer curve being characterized.

11 Claims, 3 Drawing Sheets

SUBTRACTIVE MEASUREMENT METHOD AND APPARATUS FOR CRT OUTPUT INTENSITY MEASUREMENT

CROSS REFERENCES TO RELATED APPLICATIONS

This application is related to U.S. application entitled Luminance Measurement Method And Apparatus having U.S. Ser. No. 07/855,281, to U.S. application entitled CRT Calibrator Unit having U.S. Ser. No. 07/855,260, to U.S. application entitled Monitor Calibrator Housing And Mounting Bracket having U.S. Ser. No. 08/85,399, and to U.S. application entitled Method And Apparatus For Adaptive Color Characterization And Calibration having U.S. Ser. No. 07/855,280 all assigned to Eastman Kodak Company an incorporated by reference herein.

BACKGROUND OF THE INVENTION

1. Field of the Invention

The present invention is directed to a technique for measuring color cathode ray tube (CRT) luminance or output for each primary gun of or color produced by the CRT and, more particularly, to a technique that biases the measured signal into a measurement range of a sensor by turning on, partially or fully, one or more electron beam guns for colors other than the color being measured, thereby allowing measurements above a noise level to be made for the remaining colors.

2. Description of the Related Art

To successfully calibrate a color cathode ray tube (CRT) or monitor, it is necessary to measure the light intensity output of the individual red, green, and blue (RGB) primary guns at varying voltage level or digital luminance control values. This can be done by displaying varying intensity primary color patches on the CRT and using an optical power meter or some other light measuring device to measure the light intensity in foot lamberts (fL.) or some other light intensity measurement unit. Typically, the photopically measured light intensity emitted by the blue gun alone at 100% intensity is 1.9 fL. which is very low compared to the green gun which at 100% intensity produces 15.51 fL. Inexpensive light intensity measurement sensors, such as the Kodak part number 237092 available from Eastman Kodak Co. and used in Kodak cameras, such as the model S500, exhibit noise at low light levels and are therefore not suitable for blue gun measurement. For example, the typical blue gun outputs 0.09 fL at 25% full intensity and in most of the operating range of the blue gun, the light intensity produced is less than the 1.5 fL. noise level mentioned above. To accurately measure the light output of the blue gun, an expensive, more accurate measuring device must be used. Further, at such low light levels, the measurements are less accurate due to ambient light infiltration into the glass of the CRT.

What is needed is a measurement method and apparatus which allows accurate intensity measurements with a low cost sensor such as that mentioned above.

SUMMARY OF THE INVENTION

It is an object of the present invention to measure CRT light intensities with a low cost light sensor.

It is another object of the present invention to measure light intensity of each primary channel without regard to ambient light level.

It is also an object of the present invention to measure light intensity in a noise free operating range of a low cost sensor.

The above objects can be attained by a subtractive measurement technique in which a CRT display light intensity output is biased above the noise range of a sensor to a noise free level at which a bias value is measured. The bias value is obtained by turning on one or more of the electron beam guns for colors for which the intensity is not to be measured. The gun for the color to be measured is then digitally incremented through its operating range using digital input gun drive values and measured light intensity values are obtained using a low cost achromatic sensor. The bias value is then subtracted from the measured values to obtain the actual light intensity values corresponding to the digital input drive values for the light intensity color curve being characterized.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
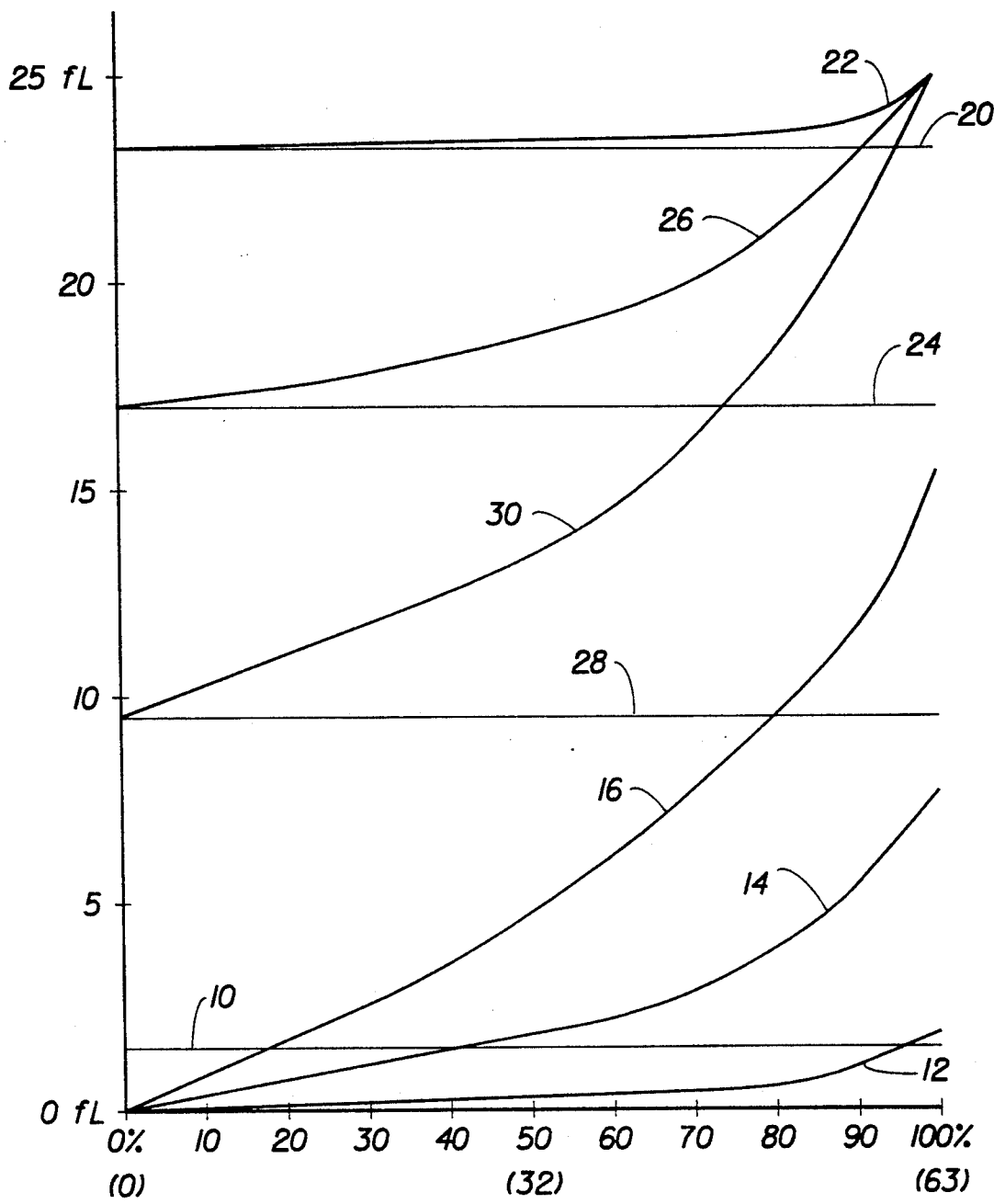
FIG. 1 illustrates the principles of the present invention.

The typical noise level 10 of a light to frequency converter sensor, such as the achromatic sensor produced by Kodak previously mentioned and preferably used during CRT calibration is illustrated in FIG. 1. As can be seen the majority of the light intensity curve 12 (for the output produced by the CRT when the blue gun alone is active) is below the noise level 10. This figure also illustrates that substantial portions of the red 14 and green 16 light output curves are below the noise level of the preferred sensor. That is, as illustrated in FIG. 1 if the light output produced by either the red, green or blue gun alone is measured using the preferred sensor, noise will prevent an accurate measurement from being made, particularly in the low intensity portions of the characteristic light output curves. This problem can be solved by biasing the light output signal or luminous level into the operating range of the sensor which is above the noise level 10. The difference between the output light intensity at the bias level and that produced by incrementing the gun for the color to be measured through its operating range plus the bias light level can be obtained and is the actual light intensity which would be produced by that gun alone, absent noise. This biasing is also illustrated in FIG. 1. For example, as illustrated in FIG. 1, if the CRT output when 100% white, that is 100% red plus 100% green plus 100% blue is measured at 25 fL. and if the CRT output when 100% white minus 100% blue (which is equivalent to 100% red plus 100% green) is measured at 23.1 fL then since the light output of the primaries are additive 100% blue can be calculated as 25.00 minus 23.1 or 1.9 fL. As a result, if the red and green guns are fully turned on, a bias level 20 which is well above the noise level 10 can be produced allowing the blue light output curve 22 to be measured in the more accurate measurement range of the preferred less expensive light measuring device. The bias level 24 for measuring the red gun light intensity output curve 26, as shown in FIG. 1, is approximately 17 fL. while the bias level 28 for measuring the green curve 30 is approximately 9.5 fL.

Figure 2:
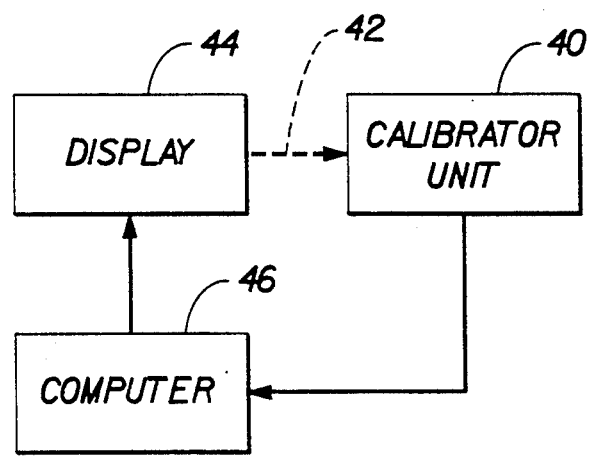
FIG. 2 depicts the hardware of the present invention.

The typical hardware arrangement in which the light intensities are measured by the subtractive measurement technique of the present invention is illustrated in FIG. 2. A calibrator unit 40, such as the precision color calibrator available from Radius Incorporated of San Jose, Calif. or more preferably a calibrator unit as described in the related applications mentioned above, measures the light 42 produced by a CRT display 44 driven by a computer 46. The computer 46 and display would typically be a Macintosh computer available from Apple Incorporated or an IBM PC/PS II computer system available from IBM. The calibrator unit 40 provides light intensity values to the computer 46 based on the measured light intensity. The preferred calibrator unit provides a count value (frequency) which corresponds to the measured light intensity output. Of course other measures of light intensity can be used.

Figure 3:
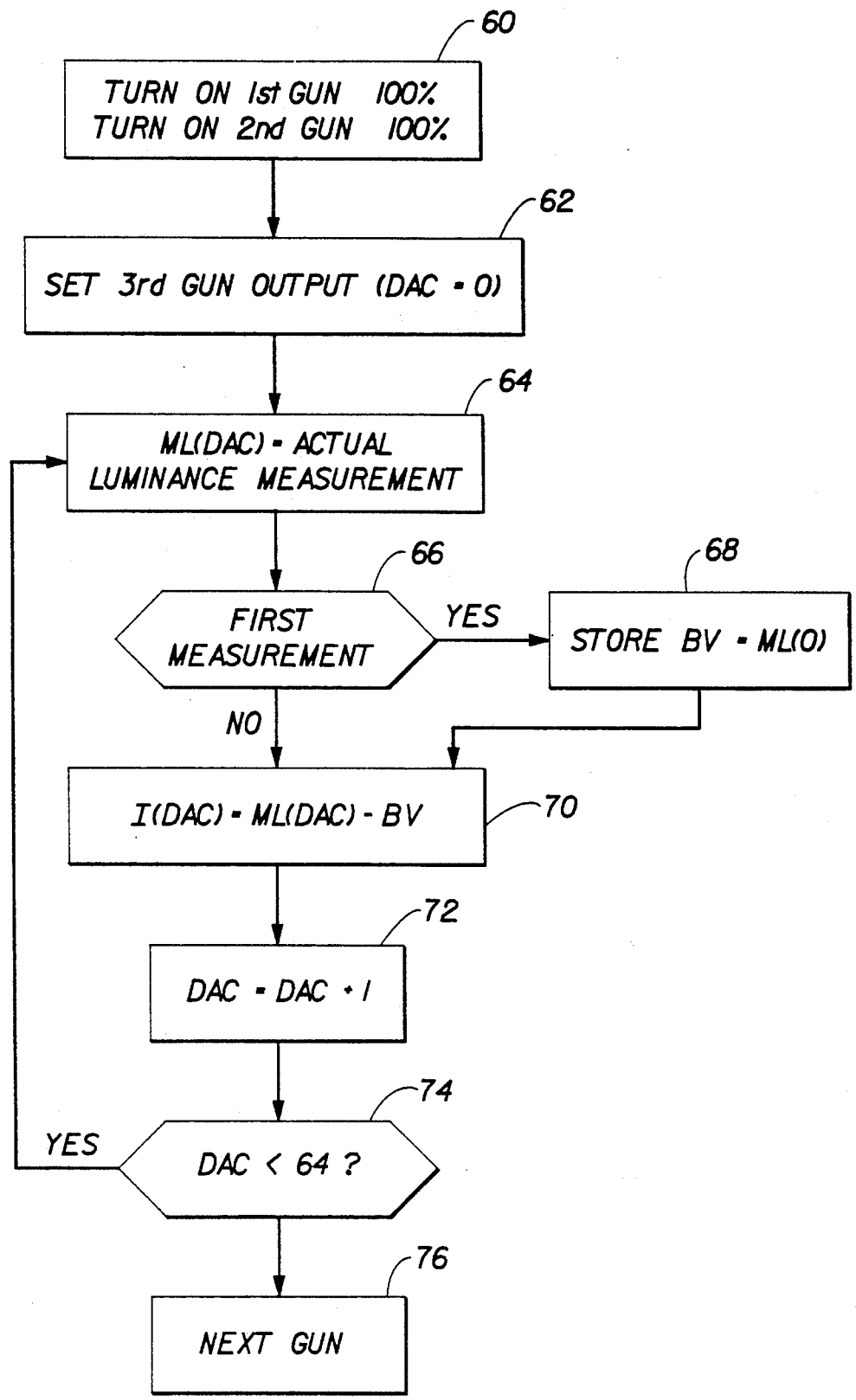
FIG. 3 illustrates the measurement method of the present invention.

The subtractive measurement method of the present invention preferably should start with a monitor in which the contrast and brightness controls have been set. These controls, if adjusted, will affect the preset characteristics of the monitor and, as a result, should not be changed from the preset settings during measurements in accordance with the present invention. The method of the present invention, as illustrated in FIG. 3, starts by turning on 60 the color guns, for the two colors being used to produce the bias level, at a level of 100%. For example, if the computer produces a luminosity control digital value equal to 63 so as to drive a gun at a 100% intensity level, the digital outputs which control the first and second guns are set a digital value corresponding to the value 63 at 63. If, on the other hand the digital value used to control the gun ranges from 0-255, the output value for the two guns is set at 255. And as illustrated in FIG. 1 the selection of the two guns to be turned on depends on which color is being measured.

Next, the system sets 62 the output of the third gun for the color being measured to zero. The system then enters a measurement loop in which the luminance output by the CRT display 44 is measured. In this loop the calibrator unit 40 measures 64 the luminance level. If this is the first 66 cycle of the loop, the measured value is stored 68 as a bias value BV. Then in this cycle of the loop and all the following cycles of the loop the bias value is subtracted 70 from the measured luminance value and the resulting value is stored as the intensity for this particular digital output the controls the first and second guns for the color being measured. Next, the system increments the digital output controlling the third electron gun and determines 74 whether the end of the measurement range has been reached. If the measurement range has not been reached the system loops back to perform another measurement 64. If the end of the measurement range has been reached, the system goes on to perform 76 the same operation with one of the first or second guns. At the end of each measurement cycle for each gun the accumulated measured values for I(DAC) may be stored as a characteristic color intensity curve which can be used to produce a look-up table that can calibrate the CRT output to a desired or aim curve for that CRT color.

The present invention can also be used to calculate the brightness of the monitor plus the ambient light level assuming the power supply of the monitor is well regulated and stable and does not vary as a function of primary gun output. This is performed by measuring the light intensity when all guns are turned on 100% (a white level) and subtracting the sum of the luminance contribution of the individual primary (red, green and blue) guns that were measured subtractively as previously discussed.

Some monitors, because the power supply is weak, when several guns are turned on above a certain level, the light response curves experience sag. That is, in a situation where a single gun will produce light from 0-10 fL. when other guns are turned on only 0-9 fL. is produced. If such a monitor is encountered, the bias level needs to be adjusted such that the range of the gun being measured does not extend into the sag range of the monitor. Measuring light intensity with the subtractive method and apparatus described herein allows substantially noise free measurements to be made in the operating range of a low cost sensor. The subtractive method also provides more accurate luminance measurements of the light output produced by the guns by measuring only the contribution of the individual gun excluding brightness level and ambient light noise reflected in the glass. That is, the bias level measured by the sensor includes the ambient light produced in the environment of the computer display. A higher bias signal level also allows optical filters to be used to correct the response of a low cost light sensor, such as the preferred sensor, to a photopic response without attenuating the luminance below the minimum effective sensitivity of the sensor.

The present invention has been described with respect to turning on two guns in a three gun system and with respect to turning them on at 100% intensity level. It is possible to turn on only one gun to produce the bias level and to turn that gun on less than 100%. For example, if the red gun is turned on to produce a bias level of 7.6 fL. both the blue and green gun intensities can be measured. Further, if the green gun only is turned on at a level of at least approximately 20%, the bias level will be above the 1.5 fL. level of the noise allowing accurate measurements of the red and blue intensities. A minimum bias level of about 2.0 fL. is appropriate for the preferred sensor. The present invention has also been described with respect to using a power supply that is well regulated and does not sag. If such a power supply is available the brightness of the bias level does not matter. In a case where the monitor CRT experiences sag at brighter luminance levels, a high bias level can cause a sag, resulting in proportionately misshappen curves not representative of the intended transfer function. The optimum bias level is application dependent. In most applications the monitor CRT is being used to display contone color images and typically all three guns will be on when a calibrated RGB image is displayed. The present invention is an improvement over conventional measurement methods since the measurements are made in a biased condition closer to the average power level of the average image. The optimum bias level should be chosen based on the overall spatial luminance of an average image that will be displayed on the monitor.

The present invention is also applicable to measuring the output of other additive systems using noise prone sensors.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of measuring a characteristic color primary control value to generate a luminance transfer curve for a color cathode ray tube (CRT), comprising the steps of:
    (a) producing a bias light output by turning on a first electron beam gun of the CRT to a level above a noise level of a light sensor;
    (b) measuring the bias light output to produce a bias value using the sensor;
    (c) incrementing a light output produced by a second electron beam gun through an operating range of the second electron beam gun;
    (d) measuring the light output during step (c) to produced measured values; and
    (e) subtracting the bias value from the measured values to produce light output values of the characteristic color curve for the second electron beam gun.

2. An apparatus for measuring light output of a color display, comprising:
    sensing means for measuring light output and having a noise level; and
    means for controlling the display to produce a bias level light output above the noise level, obtaining the bias level light output from said sensing means as a bias value, controlling the display to produce a light level above the bias level light output, obtaining the light level above the bias level from said sensing means as a measured value and producing an actual output responsive to the bias value and the measured value.

3. An apparatus as recited in claim 2, wherein said sensing means comprises a light to frequency converter.

4. An apparatus as recited in claim 2, wherein said means for controlling subtracts the bias value from the measured value.

5. An apparatus as recited in claim 4, wherein said means for controlling controls the display to produce plural light levels, obtains plural measured values and produces plural actual outputs comprising a characteristic curve.

6. An apparatus as recited in claim 2, wherein the color display includes at least first and second electron beam guns, said means for controlling comprises a computer and said computer turns the first gun on to produce the bias level light output, turns the second gun on to produce the light level and measures the actual output of the second gun.

7. A method for determining the intensity of a first of plural colors displayable on a multicolor display, comprising the steps of:
    (a) displaying the first color at a level below a predetermined noise level;
    (b) displaying a second color at predetermined bias level; and
    (c) measuring the intensity of the display output to provide a measured value; and
    (d) determining the differential between the measured value and the bias value to provide a first color output value.

8. A method as recited in claim 7; wherein the light output of the first color is being measured and step (b) includes producing light output of the second color at a predetermined intensity above the noise level.

9. A method as recited in claim 8, wherein the predetermined intensity of the second color is the maximum intensity level of the display.

10. A method as recited in claim 7, further comprising the steps of:
    (c) measuring a maximum intensity value of the second color; and
    (d) determining an ambient light level plus brightness level from the maximum and measured values.

11. A method as recited in claim 7, further comprising the steps of:
    (e) increasing the intensity of the first color; and
    (f) repeating steps a-e to determine a characteristic set of first color intensity values.

* * * * *